United States Patent
Kim et al.

(10) Patent No.: US 7,912,076 B2
(45) Date of Patent: Mar. 22, 2011

(54) METHOD AND APPARATUS FOR MANAGING DOMAIN

(75) Inventors: Bong-seon Kim, Seongnam-si (KR);
Young-sun Yoon, Suwon-si (KR);
Su-hyun Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 908 days.

(21) Appl. No.: 11/514,887

(22) Filed: Sep. 5, 2006

(65) Prior Publication Data
US 2007/0168665 A1 Jul. 19, 2007

Related U.S. Application Data

(60) Provisional application No. 60/755,098, filed on Jan. 3, 2006.

(30) Foreign Application Priority Data

Mar. 24, 2006 (KR) .................. 10-2006-0026985

(51) Int. Cl.
*H04L 12/28* (2006.01)
*H04L 12/56* (2006.01)

(52) U.S. Cl. ............... 370/401; 370/402; 370/404

(58) Field of Classification Search .............. 370/401; 713/171
See application file for complete search history.

(56) References Cited

U.S. PATENT DOCUMENTS

| | | | |
|---|---|---|---|
| 6,167,052 A | 12/2000 | McNeill et al. | |
| 6,198,479 B1* | 3/2001 | Humpleman et al. | 715/733 |
| 6,973,576 B2* | 12/2005 | Giobbi | 713/193 |
| 7,349,396 B2* | 3/2008 | Ohta et al. | 370/392 |
| 2002/0062440 A1* | 5/2002 | Akama | 713/171 |
| 2002/0188562 A1* | 12/2002 | Igarashi et al. | 705/40 |
| 2003/0221097 A1* | 11/2003 | Nakano et al. | 713/150 |
| 2004/0103312 A1* | 5/2004 | Messerges et al. | 713/201 |
| 2004/0174824 A1 | 9/2004 | Ohta et al. | |
| 2005/0182727 A1* | 8/2005 | Robert et al. | 705/51 |
| 2005/0210261 A1* | 9/2005 | Kamperman et al. | 713/182 |

FOREIGN PATENT DOCUMENTS

| | | |
|---|---|---|
| CN | 1658554 A | 8/2005 |
| CN | 1714529 A | 12/2005 |
| KR | 2002-0017926 A | 3/2002 |
| KR | 10-2005-0053471 A | 6/2005 |
| TW | 538344 | 6/2003 |
| TW | 540214 | 7/2003 |
| TW | 540245 | 7/2003 |
| WO | 99/10825 A1 | 3/1999 |
| WO | 2005/055521 A1 | 6/2005 |
| WO | 2005/073871 A1 | 8/2005 |

* cited by examiner

*Primary Examiner* — Daniel Wu
*Assistant Examiner* — Frederick Ott
(74) *Attorney, Agent, or Firm* — Sughrue Mion, PLLC

(57) ABSTRACT

A method and an apparatus for managing domains are provided. The method of managing one or more domains performed by a domain manager located in a home network includes determining whether to register a first device located in the home network to a domain, and providing data required to share content between the first device and a second device registered to the domain according to the determination. In the method and apparatus, content can be shared by connecting the devices with one another including a user, and the burden of content providers for management can be reduced.

22 Claims, 6 Drawing Sheets

METHOD AND APPARATUS FOR MANAGING DOMAIN

CROSS-REFERENCE TO RELATED PATENT APPLICATION

This application claims the benefit of U.S. Provisional Patent Application No. 60/755,098, filed on Jan. 3, 2006, in the U.S. Patent and Trademark Office, and Korean Patent Application No. 10-2006-0026985, filed on Mar. 24, 2006, in the Korean Intellectual Property Office, the disclosures of which are incorporated herein in their entirety by reference.

BACKGROUND OF THE INVENTION

1. Field of the Invention

The present invention relates to a method and an apparatus for managing domains, and more particularly, to a consumer-oriented method and a consumer-oriented apparatus for managing domains constituting a set of home apparatuses capable of playing and sharing content.

2. Description of Related Art

Recently, the demands of consumers for the convenient sharing of content among various home devices have increased, reflecting a trend that various home devices for broadcasting, music, and games have emerged. In response to these demands, research into consumer-oriented home network domains which enable users to connect the devices and to share the content of the devices has been actively conducted.

FIG. 1 is a diagram for explaining a conventional method of sharing content in a home network. Referring to FIG. 1, a content provider (CP) or a rights issuer (RI) provides content or a license for the content. A user 5 can obtain and use the content after registering user information to the CP or RI 6. In order to set domains, devices 1, 2, 3, and 4, and the user 5, should connect and register through the Internet or communication lines to the CP 6 or RI 6 that have a function of managing domains, and receive domain information and information required to share the content in the domains. Here, domains are a set of devices of which content is shared, and the domains are set and managed by the CP 6 or the RI 6 connectable through the Internet.

In other words, the devices to be used by the user 5, together with the user 5, should be registered to the CP 6 or the RI 6 through the Internet and receive the information required to share the content. After this registration process, it is possible to share the content among the registered devices.

However, in this method, the content provider or rights issuer such as the CP 6 or the RI 6 having a function of managing domains should be connected with the user 5 and the devices 1, 2, 3, and 4 through the Internet, that is an external network, other than an internal home network. In other words, an Internet connection is required to update domain related data and security data for content sharing, security, and other management.

Accordingly, the conventional method described above in which all of the devices should be connected to an external network through the Internet for sharing content is inefficient and inconvenient in terms of user convenience. In addition, managing information for each user and a domain for each user is a considerable burden on the CP 6 or the RI 6 on the Internet.

SUMMARY OF THE INVENTION

The present invention provides a method and an apparatus for managing domains capable of sharing content by connecting devices in a customer-oriented approach.

According to an aspect of the present invention, there is provided a method of managing one or more domains by a domain manager located in a home network, comprising: determining whether to register a first device located in the home network to a domain; and providing data required for sharing content between the first device and a second device registered to the domain according to the determination.

According to another aspect of the present invention, there is provided a device for managing one or more domains located in a home network, the device comprising a domain data providing unit determining whether to register a first device located in the home network to a domain and providing data required to share content between the first device and a second device registered to the domain according to the determination.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, embodiments of the present invention will be described in detail with reference to the accompanying drawings.

The present invention relates to a method and an apparatus for managing home network domains in which devices are connected with one another from a consumer perspective, and content of the devices is shared. In other words, a domain manager having a function of managing domains corresponding to user devices is located in a home network, so that user convenience can be improved, and the burden on the content provider can be relieved.

Figure 1:
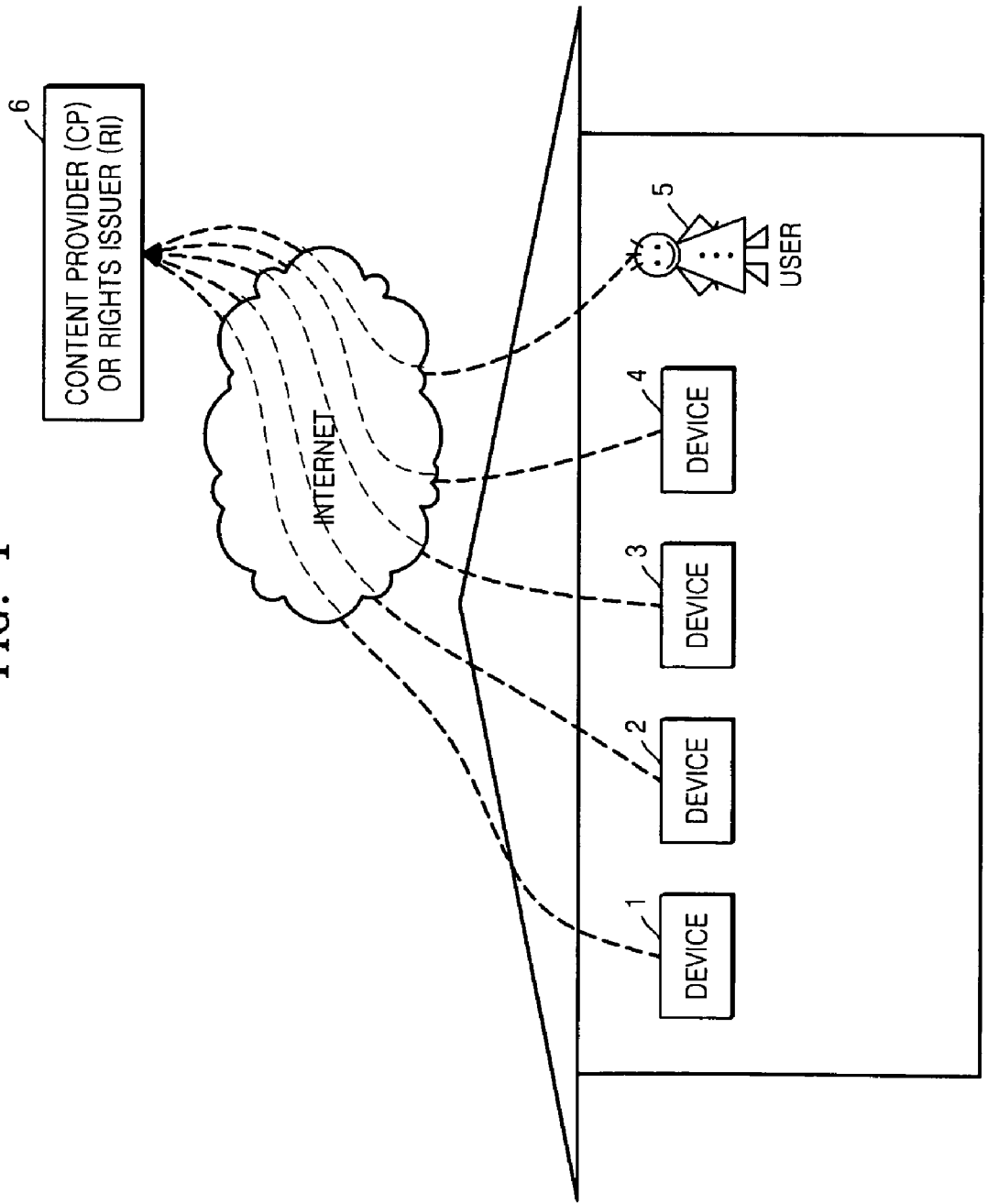
FIG. 1 is a diagram for explaining a conventional method of sharing content in a home network.
Figure 2:
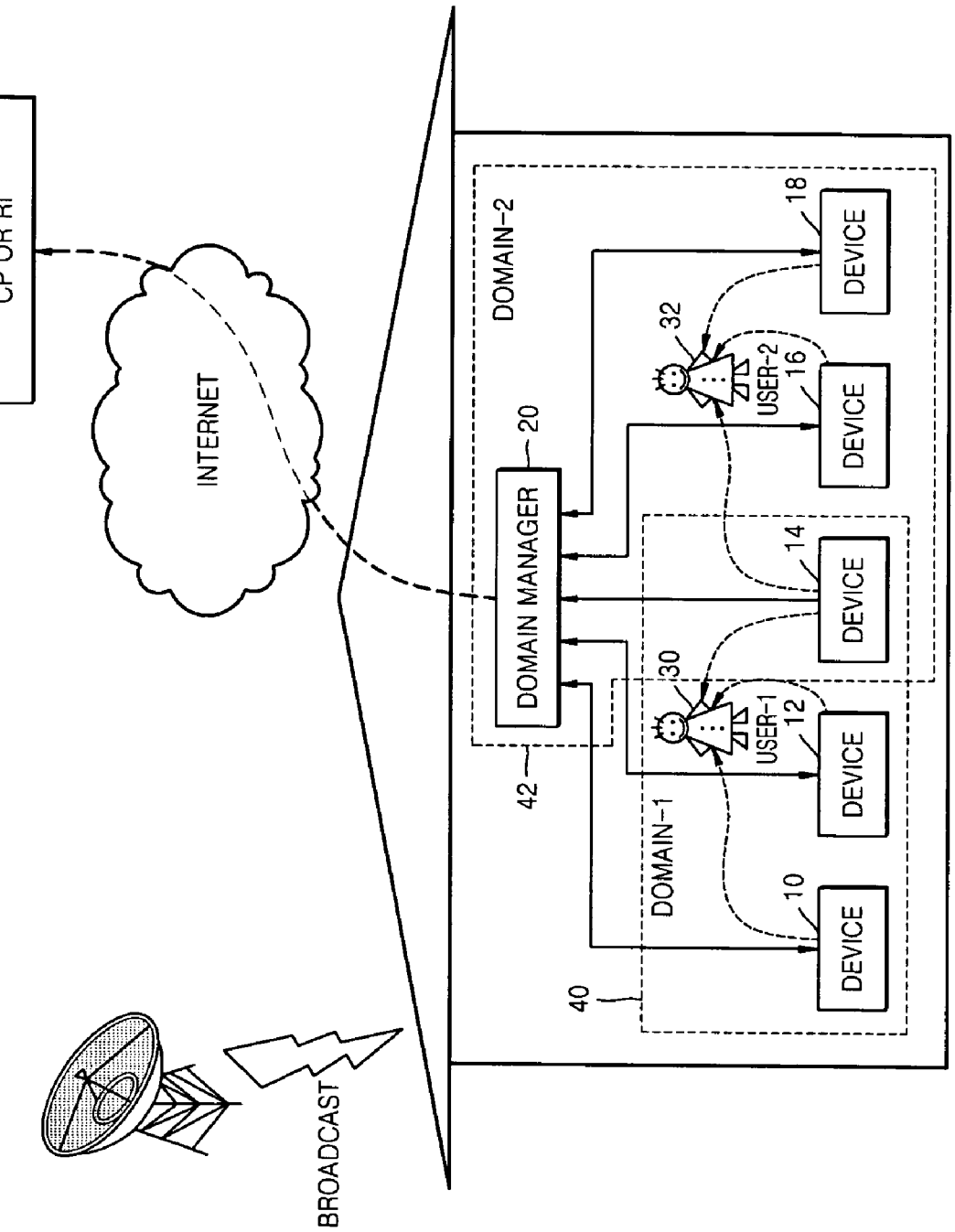
FIG. 2 is a diagram of a system including a domain manager according to an embodiment of the present invention.

FIG. 2 is a diagram of a system including a domain manager according to an embodiment of the present invention. Referring to FIG. 2, the system includes five devices 10, 12, 14, 16, and 18 of a user, a domain manager 20, and a CP or RI 50.

The domain manager 20 according to the current embodiment of the present invention is located in a home network and performs a role of managing a domain-1 40 and a domain-2 42. Here, examples of operations for managing domains include generating a domain in an initial stage, registering a home device to the generated domain in accordance with the domain policy of the domain, managing the domain, and canceling the domain registration of a device. Here, an example of the generation of a domain in the initial stage is to generate a domain identifier and a domain key. The registered device is managed, so that the registered device can securely share or play content corresponding to the domain. Detailed examples of the management of a registered device are domain registration of the device, deregistering of the device, link generation, domain membership management, and domain key generation/update. According to an embodiment of the present invention, the domain manager 20 can connect to the CP or RI 50 through the Internet as the representative of other devices 10, 12, 14, 16, and 18 and receives an authorization to use the content of the CP or RI 50. The domain manager 20 can receive authorization without providing information pertaining to the other devices 10, 12, 14, 16, and 18 to the CP or RI 50, which is different from a conventional method.

In addition, according to an embodiment of the present invention, the domain manager 20 can register itself to the domain-1 40, and use the content in the domain-1 40. This is feasible, since the domain manager 20 is an apparatus belonging to a user, while the conventional CP or RI 50 described above having a function of domain management is an external apparatus.

Referring to FIG. 2, the domain-1 40 and the domain-2 42 are set for a user-1 30 and a user-2 32, respectively. The devices 10, 12, and 14 are included as members of the domain-1 40, and the devices 16 and 18 are included as members of the domain-2 42. However, it is apparent to those skilled in the art that the present invention can be applied to a digital rights management (DRM) policy managing domains including a set of devices only, other than user-based domains.

Figure 3:
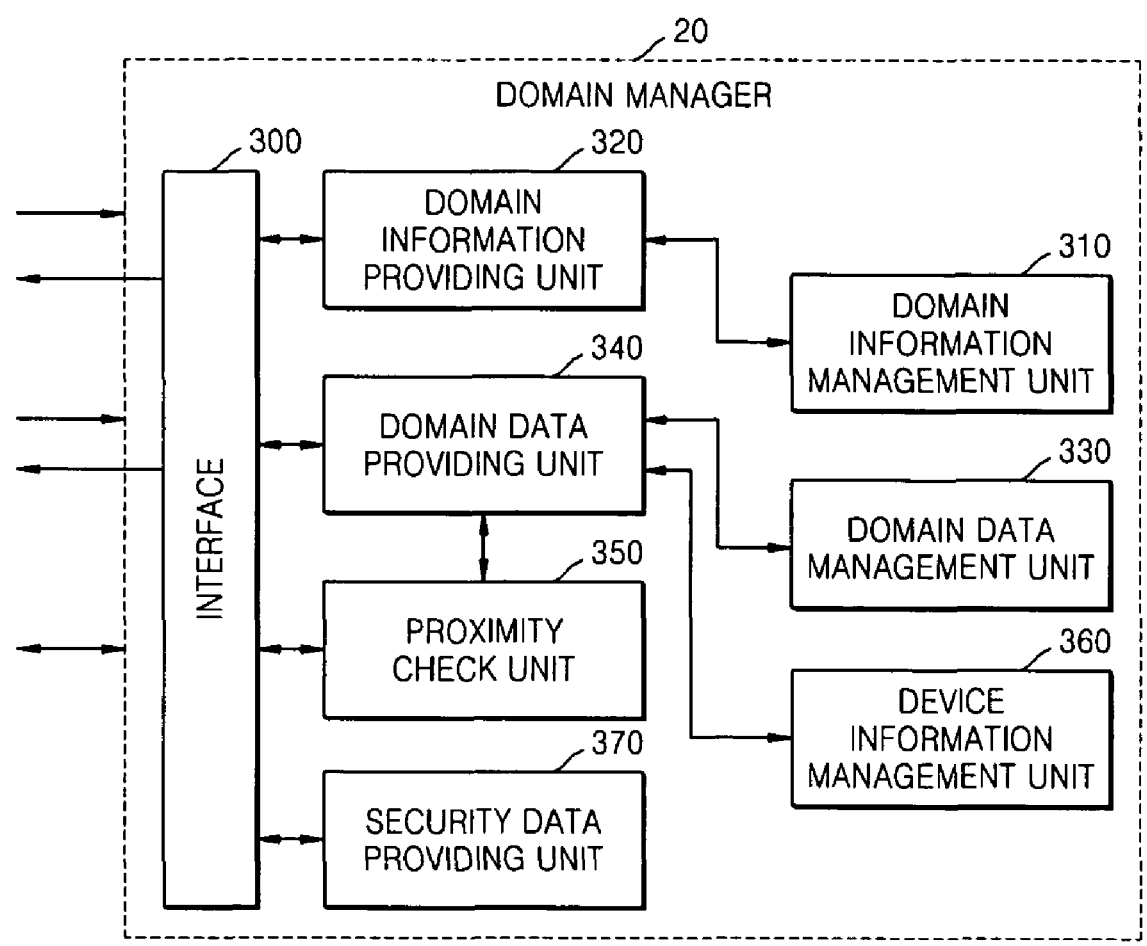
FIG. 3 is a detailed block diagram of the domain manager of FIG. 2 according to an embodiment of the present invention.

FIG. 3 is a detailed block diagram of the domain manager 20 according to an embodiment of the present invention. Referring to FIG. 3, the domain manager 20 includes an interface 300, a domain information management unit 310, a domain information providing unit 320, a domain data management unit 330, a domain data providing unit 340, a proximity check unit 350, a device information management unit 360, and a security data providing unit 370.

The interface 300 communicates with other devices 10, 12, 14, 16, and 18.

The domain information management unit 310 receives a user's input, generates at least one domain, and sets and manages information on the generated domain. Here, examples of the information which is initialized and set by the user's input include a domain identifier for each domain, a domain policy identifier, user information, and location information on devices providing data required to use content in the domain. In addition, a domain key stored in the domain data management unit 330 can be set by a user's input, which will be described later. Here, examples of the user information include a user identifier and a password. The user information can be related to the domain identifier or the domain key described above, and examples include information that the domain belongs to a user determined by the user identifier by providing the user identifier when the domain information is provided, which will be described later, and information regarding the generation or encryption of a domain key using the user information. In addition, the user information related to the domain can be used in a user authorization process which is performed when a device is registered to the domain, or registration of the apparatus to the domain is cancelled.

The domain information providing unit 320 reads the information on the generated domain from the domain information management unit 310 and provides the information to the devices 10, 12, 14, 16, and 18 located inside the home network. Examples of methods of providing the information include providing the information according to a request of the devices 10, 12, 14, 16, and 18 and providing the information at a regular interval regardless of a request. However, the method is not limited thereto. Here, an example of the information provided is information stored in the domain information management unit 310.

The domain data management unit 330 stores data required to share content in a domain. Here an example of the stored data is a domain key used for decoding content in the domain.

The domain data providing unit 340 determines whether to register an apparatus located inside the home network to the domain and provides data required to share content in the domain to the device which is determined to be registered. Here, examples of the provided data include a domain key and information pertaining to a validity of a domain membership. The information on the validity of the domain membership will be described later.

When the domain policy is set to register only devices that satisfy a proximity condition and a validity condition of apparatus information, the domain data providing unit 340 determines whether to register the device according to the proximity check and whether the validity condition of the device is satisfied. Here, the validity check of the device comprises checking whether the device is a device to be managed by the domain manager 20. An example of the proximity check comprises checking whether a physical distance from the domain manager 20 satisfies a physical distance limitation condition. However, the check method is not limited thereto.

The proximity check unit 350 checks proximity of the device from the domain manager 20 itself and provides a result of the proximity check to the domain data providing unit 340.

The device information management unit 360 stores information on devices which have been determined to be registered. Here, examples of the device information include a device identifier and a device key received from the device which has requested registration and domain validity information which has been generated by the domain data providing unit 340 in a registration determination process. The device key can be used for encrypting data in a transfer path from the domain manager 20 to a device. An example of the data is a domain key. The domain membership validity information represents a valid qualification as a registered device to the domain. An example of the domain membership validity information is time information representing a valid period of a domain member of the registered device.

Domain generation, domain member registration and provision of data required to share content have been mainly described as above, and a process of updating data required to share the content will now be described with reference to FIG. 3.

The domain data providing unit 340 updates data required for sharing content, in addition to the function described above, stores the updated data in the domain data management unit 330, and informs the registered device of the updated result. Here, an example of a method of determining whether to update the data is by detecting a change in registered devices or security risk. In addition, the domain data providing unit 340 reads the updated data from the domain data management unit 330 in response to a request of the device which has been informed of the update result and provides the updated data to the device which made the request.

The security data providing unit 370 provides a registered device with security data such as secure time and a revocation list. Here, the secure time is time information relating to the calculation of a valid time of contents in the domain and used when contents are imported. The revocation list is information on apparatuses which have been revoked for predetermined reasons. The revoked apparatus cannot share content with other devices anymore.

The domain data providing unit 340 removes device information on a device, which has requested to cancel the registration to the domain, from the device information management unit 360, when a request for the cancellation is received from the device through the interface 300 and updates data required to share content in the domain to which the cancellation of the registration is requested.

Figure 4:
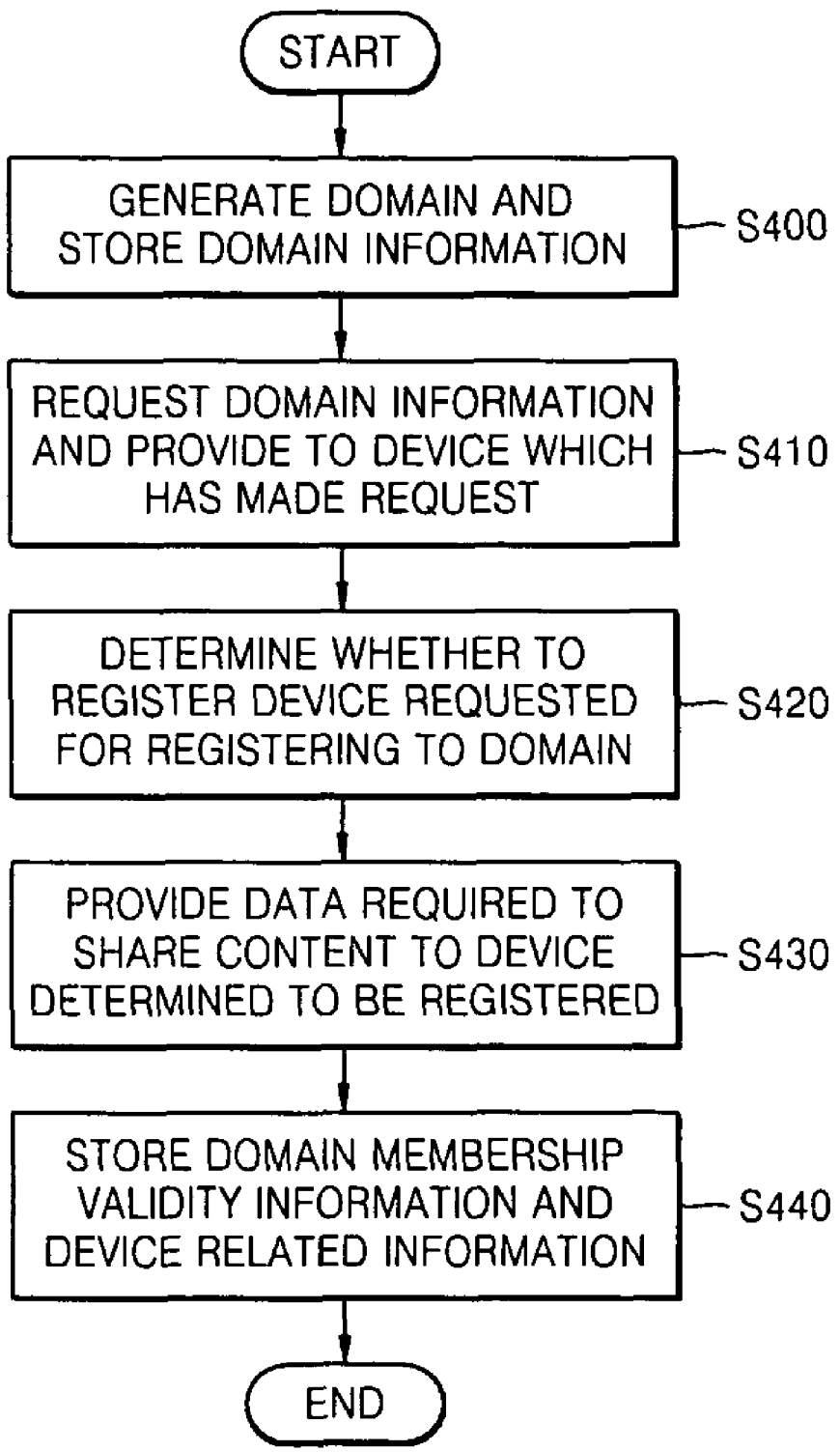
FIG. 4 is a flowchart of a method of managing domains according to an embodiment of the present invention including processes of domain generation, member registration, and data transfer.

FIG. 4 is a flowchart of a method of managing domains according to an embodiment of the present invention including processes of domain generation, member registration, and data transfer.

Referring to FIG. 4, the domain manager 20 generates at least one domain, and information on the generated domain is stored in the domain information management unit 310 (S400). In other words, the domain information management unit 310 is initialized by a user's input information, and the input information is stored securely. Examples of the initialized information include a domain identifier, a domain policy identifier, a domain key for each domain, user information, and location information on a device providing data for sharing content in a domain. In addition, the domain manager 20 can register itself to a domain and store data required to share content in the domain in operation S400 or after operation S400. Examples of the data include a domain key and domain membership validity information.

Thereafter, the domain information providing unit 320 receives a request for information on the generated domain from the device 12 reads the information from the domain information management unit 310 and provides the information to the device 12 which has made the request, as a response (S410). Thereafter, the device 12 is determined to be registered to the domain-2 42 according to the received information and requests the domain manager 20 to be registered. Here, when a registration is requested, a device identifier, an apparatus key, and the like of the device 12 are provided to the domain manager 20, and the provided information is transferred to the domain data providing unit 340 through the interface 300.

The domain data providing unit 340 determines whether to register the device 12 to the domain-2 42 according to a proximity check of the proximity check unit 350 and a validity check of the device 12 (S420). The check is performed in accordance with a domain policy of the domain-2 42.

The domain data providing unit 340 provides the data required to share content in the domain to the device 12 securely. An example of a process performed by the domain data providing unit 340 in order to provide the data is a process in which, domain membership validity information for the device 12 is generated, a domain key and the like are read from the data management unit 350, the read domain key and the generated domain membership validity information are encrypted using the provided device key in operation 410. As examples of the provided data, only the domain key and the domain membership validity information have been mentioned, however, it is apparent to those skilled in the art that link information indicating that the device 12 belongs to the domain-2 42 can be also provided.

Thereafter, the domain data providing unit 340 stores the domain membership validity information generated in operation S430 and the device identifier, the device key, and the like provided in operation S410 in the device information management unit 360 (S440).

Thereafter, the device 12 can play or share the content belonging to domain-2 42 through a decoding process using the domain key and the like.

Figure 5:
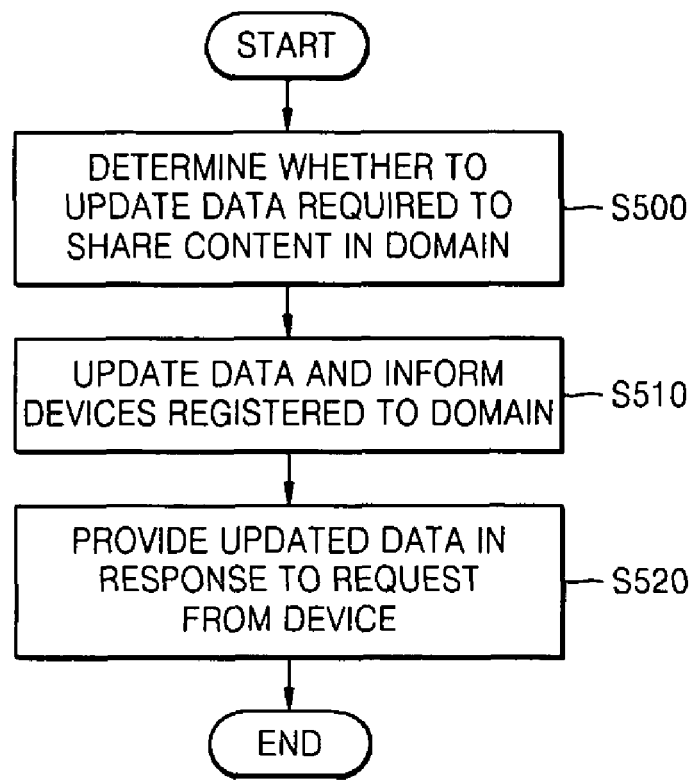
FIG. 5 is a flowchart of a data update process included in a method of managing domains according to an embodiment of the present invention.

FIG. 5 is a flowchart of a data update process included in a method of managing domains according to an embodiment of the present invention. In other words, FIG. 5 is a flowchart illustrating a method of updating data required to share content in a domain according to an embodiment of the present invention, and the method will now be described with reference to FIG. 3 on a premise of a data update status of the domain-2 42 in FIG. 2.

At first, the domain data providing unit 340 determines whether to update data required to share content in the domain (S500). An example of the determining method is to determine whether to update the data by detecting a change in a domain member such as revocation of a registered device or security risk such as a leakage of the domain key.

Thereafter, the domain data providing unit 340 updates data according to the determination, stores the updated data in the domain data management unit 330, and informs the devices 14, 16, and 18 registered to the domain of the data update (S510). An example of the updated data is a domain key.

Thereafter, upon a request of the device 14 which has been informed of the data update, the domain data providing unit 340 securely transfers the data updated in operation S510 to the device 14 (S520). In addition, an update notice in operation S510 and the transferred data in operation S520 may undergo an encryption process using the stored device information. An example of the encryption method is to encrypt using the device key of the device 14.

The device 14 which has received the updated data through operation S520, stores the updated data. Thereafter, content in the domain is encrypted and shared using the updated domain key, so that a device that is deregistered or has a security risk such as hacking cannot share the content thereafter since the device has not received the updated domain key.

Figure 6A:
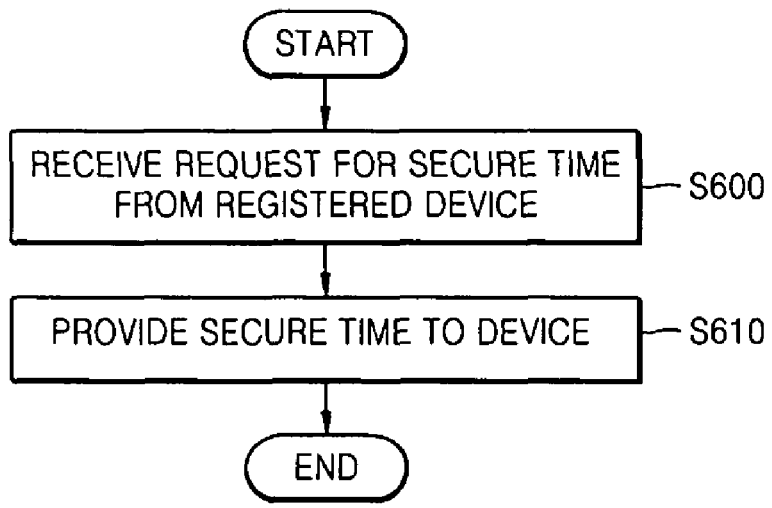
FIG. 6A is a flowchart of a method of managing domains providing secure time according to an embodiment of the present invention.
Figure 6B:
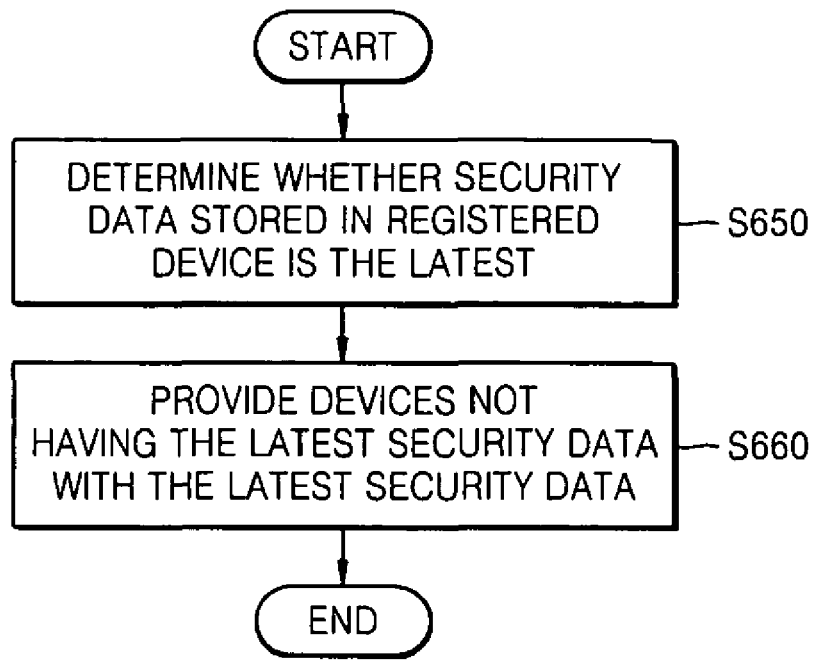
FIG. 6B is a flowchart of a method of managing domains providing a device revocation list according to an embodiment of the present invention.

FIGS. 6A and 6B are flowcharts of security data providing processes in a method of managing domains according to an embodiment of the present invention. Here, the security data is data including secure time and device revocation information as described above.

FIG. 6A is a flowchart of a method of managing domains providing secure time according to an embodiment of the present invention. It is assumed that domain generation and device registration have been performed previous to operation S600, even though these operations are not illustrated in FIG. 6A.

Referring to FIG. 6A, at first, the security data providing unit 370 receives a request for the secure time from a device registered to a domain (S600). An example of a case when a device requests the secure time is when the device imports content. When content is imported, a time stamp indicating from when the content is used for the domain is required, and a reference time is the secure time. This time stamping is used as a method in which the content shared before a device cancels the registration can continuously be used by the registration-cancelled device which was a domain member when importing was performed by comparing the registration canceling time and the importing time.

Thereafter, the security data providing unit 370 provides the secure time to the device which has made the request (S610). Thereafter, the device imports the content using the provided secure time.

FIG. 6B is a flowchart of a method of managing domains providing a device revocation list according to an embodiment of the present invention. It is assumed that domain generation and device registration have been preformed previous to operation S600, even though these operations are not illustrated in FIG. 6B.

Referring to FIG. 6B, at first the security data providing unit 370 determines whether security data stored in the devices registered to each domain is the most current (S650). Here, it is determined whether the device revocation list stored in the devices registered to the domain is the most current information, so as not to share content with a device which has been revoked after the device revocation list is issued when the device registered to the domain has a previous device revocation list, and the device revocation list stored in the registered device is updated according to the determination.

Thereafter, when it is determined that there is a device not having the most current data, the security data providing unit 370 provides the most current revocation list to the device (S660).

Thereafter, devices in the domain can share content in the domain securely using the device revocation list received from the domain manager 20.

Figure 7:
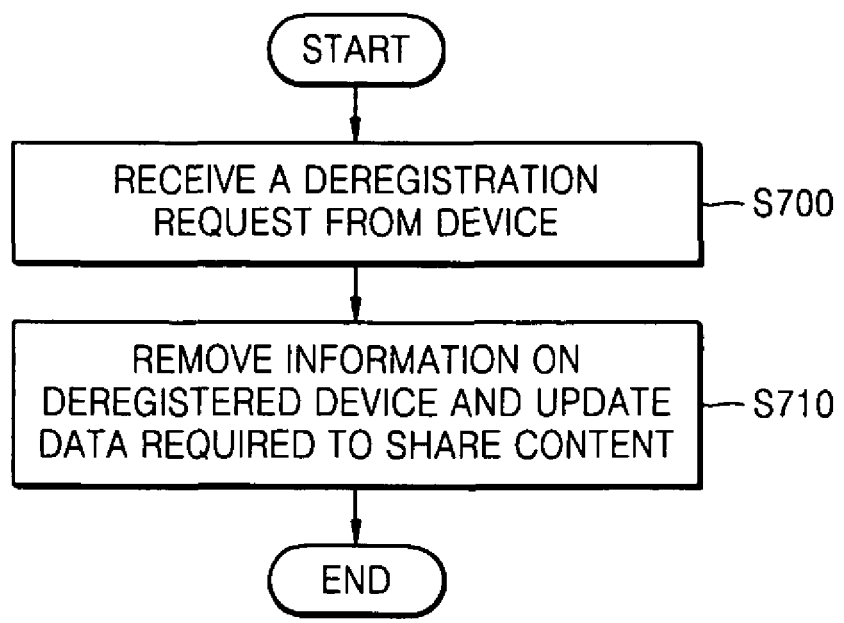
FIG. 7 is a flowchart of a deregistering process included in a method of managing domains according to an embodiment of the present invention.

FIG. 7 is a flowchart of a registration canceling process included in a method of managing domains according to an embodiment of the present invention. The registration canceling process will be described with reference to FIG. 3 on the basis that the device 18 cancels a registration to the domain-2 42.

Referring to FIG. 7, at first, the domain data providing unit 340 receives a registration cancel request from the device 18 (S700). In other words, the domain data providing unit 340 receives a registration cancel request from a device among devices registered to the domain which does not want to share contents in the domain.

Thereafter, the domain data providing unit 340 removes device information of the device 18 which has requested to cancel the registration from the device information management unit 360 and updates data required to share content in the domain in accordance with a domain policy of the domain (S710). Thereafter, an update result and updated data are transferred as described with reference to FIG. 5. As a result, the user device cannot share content which has come into the domain after the device cancels the registration, since the device uses a previous domain key.

When the domain policy is set to limit the number of devices to be registered to each domain or the number of domains to which each device registers, the domain manager 20 performs a registration process according to the policy. According to a management method having this domain policy, there is an advantage that a management burden for both the domain manager 20 and the content providers, is decreased.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, a domain manager located in a home network provides other devices with information on domains set in the home network, information required to use content in the domains, security information related to domain security, so that the domain manager can manage and maintain domains effectively and securely with a user, and domain registration and other domain-related operations can be performed when all the devices included in the domain do not have a function to connect to an external network. Additionally, according to the present invention, a user can maintain the same domain although content from various content sources are used, and the content from various content sources in the domain can be shared together with the devices in the domain, and inconvenience of registration with each content provider, which is experienced when a domain is set to each content source, can be avoided.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of managing one or more domains by a domain manager located in a home network, comprising:
   determining whether to register a first device located in the home network to a domain;
   providing data required for sharing content between the first device and a second device registered to the domain according to the determination; and
   updating the data and informing registered devices of the update,
   wherein the data comprises a domain key used for decoding the content, and the domain key is encrypted using a device key of the first device.

2. The method of claim 1, further comprising, registering the domain manager with the domain.

3. The method of claim 1, further comprising performing a proximity check of the first device, wherein the determining of the registration of the first device is based on the proximity check.

4. The method of claim 1, wherein the data comprises information on domain membership validity indicating valid qualification as a device registered to the domain.

5. The method of claim 1, further comprising, providing information on the managed domains to one or more devices located in the home network.

6. The method of claim 1, further comprising detecting a change in the devices registered to the domain or a security risk and determining whether to update the data according to the detection.

7. The method of claim 1, further comprising providing the updated data in response to a request of the devices which have been informed of the update.

8. The method of claim 1, further comprising providing security data comprising at least one of a secure time and a device revocation list to devices registered to the domain,
   wherein the secure time is time information which is a reference for calculating a valid time of content in the domain, and wherein the device revocation list is information on revoked devices.

9. The method of claim 8, wherein the providing of the security data comprises:
receiving a request for the security data from a registered device; and
providing the security data to the registered device which has requested the security data.

10. The method of claim 8, wherein the providing of the security data comprises:
determining whether the security data of devices registered to each domain is the most current; and
providing the most current security data to one or more devices which do not have the latest security data, when it is determined that the said one or more devices do not have the most current security data.

11. The method of claim 1, further comprising removing stored device information on a device in response to a request to deregister the device from the domain and updating data required to share content in the domain.

12. The method of claim 1, further comprising limiting the number of registered devices to each domain or the number of domains to which each device is registered to a predetermined number.

13. An apparatus for managing one or more domains located in a home network, the device comprising a domain data providing unit determining whether to register a first device located in the home network to a domain and providing data required to share content between the first device and a second device registered to the domain according to the determination,
wherein the data comprises a domain key used for decoding the content, and the domain key is encrypted using a device key of the first device,
and wherein the domain data providing unit updates the data and informs registered devices of the update.

14. The apparatus of claim 13, further comprising a proximity check unit performing a proximity check of the first device, wherein the domain data providing unit determines whether to register the first device according to the proximity check.

15. The apparatus of claim 13, further comprising a domain information providing unit providing information on the managed domains to one or more devices located in the home network.

16. The apparatus of claim 13, further comprising a security data providing unit providing security data comprising at least one of a secure time and a device revocation list to devices registered to the domain,
wherein the secure time is time information which is a reference for calculating a valid time of content in the domain, and
wherein the device revocation list is information on revoked devices.

17. The apparatus of claim 13, further comprising a device information storage unit storing device information on the registered devices, wherein the domain data providing unit removes stored device information on a device in response to a request to deregister the device from the domain and updates data required to share content in the domain.

18. A computer readable storage medium, embodying a non-transitory signal, having embodied thereon a computer program for the method of claim 1.

19. A method of generating content that is usable in a domain, the method comprising:
requesting a secure time to a security data providing unit of the domain;
receiving the secure time;
setting the secure time as a point of time at which the content that is usable in the domain is generated;
providing security data comprising providing a device revocation list to devices registered to the domain;
requesting a device revocation list of the domain; and
controlling the generation of the content according to the device revocation list of the domain,
wherein the device revocation list is information on revoked devices.

20. The method of claim 19, further comprising stopping the generation of the content when the device revocation list includes information on the device which generates the content.

21. The method of claim 19, further comprising requesting a domain key for encrypting the content.

22. The method of claim 19, further comprising encrypting the encryption key of the content using the domain key.

* * * * *